US012437654B2

(12) United States Patent
Vining et al.

(10) Patent No.: US 12,437,654 B2
(45) Date of Patent: Oct. 7, 2025

(54) OPTIMIZING A FLIGHT OF AN AIRCRAFT WITH AT LEAST ONE SEGMENT OF FORMATION FLIGHT

(71) Applicant: The Boeing Company, Chicago, IL (US)

(72) Inventors: Kirk A. Vining, Renton, WA (US); Alvin L. Sipe, Kenmore, WA (US); Dragos D. Margineantu, Bellevue, WA (US); Tristan C. Flanzer, Seattle, WA (US)

(73) Assignee: The Boeing Company, Arlington, VA (US)

( * ) Notice: Subject to any disclaimer, the term of this patent is extended or adjusted under 35 U.S.C. 154(b) by 403 days.

(21) Appl. No.: 17/500,544

(22) Filed: Oct. 13, 2021

(65) Prior Publication Data

US 2022/0198943 A1 Jun. 23, 2022

Related U.S. Application Data

(60) Provisional application No. 63/126,670, filed on Dec. 17, 2020.

(51) Int. Cl.
*G08G 5/34* (2025.01)
*G01C 23/00* (2006.01)
(Continued)

(52) U.S. Cl.
CPC ............. *G08G 5/34* (2025.01); *G01C 23/005* (2013.01); *G06N 5/04* (2013.01); *G06N 20/00* (2019.01); *G08G 5/25* (2025.01)

(58) Field of Classification Search
None
See application file for complete search history.

(56) References Cited

U.S. PATENT DOCUMENTS 6,134,500 A * 10/2000 Tang .................... G05D 1/0005
73/178 R
6,177,888 B1 1/2001 Cabot et al.
(Continued)

FOREIGN PATENT DOCUMENTS

WO WO-2017161304 A1 * 9/2017 ............. B64C 13/16

OTHER PUBLICATIONS

Predicting flight routes with a Deep Neural Network in the operational Air Traffic Flow and Capacity Management system, Eurocontrol, https://www.eurocontrol.int/archive_download/all/node/11314 (Year: 2018).*

(Continued)

*Primary Examiner* — Redhwan K Mawari
*Assistant Examiner* — Kai Wang
(74) *Attorney, Agent, or Firm* — Alleman Hall & Tuttle LLP (57) ABSTRACT

A method is provided for optimizing a flight of an aircraft with at least one segment of formation flight. The method includes accessing flight plans for flights of a fleet, and transforming the flight plans into values of a set of features that describe segments of the flights. The values are applied to a machine learning model trained to predict the segment (s) during which the aircraft is within a region that includes at least one second aircraft of the fleet that is thereby capable of serving as a leading aircraft in the segment(s) of formation flight in which the aircraft is a trailing aircraft. A notification is sent to the aircraft of the segment(s) and the second aircraft capable of serving as the leading aircraft. And a second notification is sent to the second aircraft of the segment(s) and the aircraft capable of serving as the trailing aircraft.

21 Claims, 6 Drawing Sheets

(51) Int. Cl.
*G06N 5/04* (2023.01)
*G06N 20/00* (2019.01)
*G08G 5/25* (2025.01)

(56) References Cited

U.S. PATENT DOCUMENTS

| | | | | |
|---|---|---|---|---|
| 8,949,090 | B2 | 2/2015 | Whitehead et al. | |
| 9,020,663 | B2* | 4/2015 | Smith | G08G 5/53 |
| | | | | 340/963 |
| 9,250,099 | B2* | 2/2016 | Felix | G08G 5/55 |
| 9,773,415 | B2* | 9/2017 | Villar | G05D 1/0217 |
| 10,852,157 | B2* | 12/2020 | Shafaat | G08G 5/53 |
| 11,094,206 | B2* | 8/2021 | Bailey | G08G 5/53 |
| 2018/0286254 | A1* | 10/2018 | Westervelt | G08G 5/32 |
| 2018/0357909 | A1* | 12/2018 | Eyhorn | G08G 5/34 |
| 2019/0287412 | A1* | 9/2019 | Garai | G08G 5/34 |
| 2019/0340934 | A1* | 11/2019 | Villa | G08G 5/56 |
| 2020/0202723 | A1* | 6/2020 | Pierre | G06N 3/045 |
| 2021/0118310 | A1* | 4/2021 | Kohashi | G06F 18/214 |
| 2021/0383706 | A1* | 12/2021 | Gibbons, II | G08G 5/26 |

OTHER PUBLICATIONS

Air traffic control by New World Encyclopedia https://www.newworldencyclopedia.org/entry/Air_traffic_control (Year: 2023).*
Airbus fello'fly: reducing fuel consumption up to 10%. Eurocontrol, Supporting European Aviation, Feb. 18, 2021. Retrieved from the Internet <URL: https://www.eurocontrol.int/article/airbus-fellofly-reducing-fuel-consumption-10>.
Perry, D. Airlines SAS and French Bee line up behind Airbus for fello'fly fuel-saving tests. Analysis, FlightGlobal, Sep. 9, 2020. Retrieved from the Internet <URL: https://www.flightglobal.com/airlines/sas-and-french-bee-line-up-behind-airbus-for-fellofly-fuel-saving-tests/140096.article>.

* cited by examiner

FIG. 5

OPTIMIZING A FLIGHT OF AN AIRCRAFT WITH AT LEAST ONE SEGMENT OF FORMATION FLIGHT

CROSS-REFERENCE TO RELATED APPLICATION(S)

This application claims priority to U.S. Provisional Application No. 63/126,670, filed Dec. 17, 2020, entitled OPTIMIZING A FLIGHT OF AN AIRCRAFT WITH AT LEAST ONE SEGMENT OF FORMATION FLIGHT, the content of which is incorporated herein by reference in its entirety.

TECHNOLOGICAL FIELD

The present disclosure relates generally to aircraft operation and, in particular, to optimizing a flight of an aircraft with at least one segment of formation flight.

BACKGROUND

The formation of wake or wingtip vortices trailing behind an aircraft during flight is well known and documented. Generally, when wings are generating lift, air from below the wing is drawn around the wingtips into the region above the wings due to the lower pressure above the wing, which causes a respective vortex to trail from each wingtip. Wingtip vortices cause vortical air patterns behind the aircraft, which can benefit trailing aircraft. In this regard, formation flight may be described as an arrangement of two or more aircraft flying together in a group, usually in a predetermined pattern. Generally, one aircraft in the formation is designated as a lead aircraft with the remaining aircraft being designated as trailing or wingman aircraft. The benefits of formation flight may include performance advantages such as aerodynamic efficiency as a result of a reduction in induced drag and fuel consumption, as well as an increase in payload and range capacity.

Currently there exists a gap in decision-making to optimize a flight of an aircraft with at least one segment of formation flight. In conventional chase flights, the lead and trailing aircraft must either depart simultaneously, or the lead aircraft must delay or circle in order to ensure the trailing aircraft can join in formation without an extended high-power tail chase to catch up. Simultaneous departure is not conducive to airline route planning, and a circle or delay maneuver to assist a trailing aircraft may reduce or eliminate the benefit gained from subsequent cooperative trajectories.

BRIEF SUMMARY

Example implementations of the present disclosure are directed to aircraft operation and, in particular, to optimizing a flight of an aircraft with at least one segment of formation flight. Example implementations provide an optimization that can direct a pilot to a possible cooperative pairing for formation flight along their planned route of flight. The various daily vagaries in flight path and times for scheduled flights present a challenge to forecasting possible cooperative pairs. Example implementations may use flight data for historical flights of a fleet of aircraft to make a prediction of possible cooperative pairings for a flight before departure, and assist with updates during the flight. Example implementations may advise a crew when a possible cooperative pairing may exist without requiring an airplane to make a lag turn or an extended tail chase.

The present disclosure thus includes, without limitation, the following example implementations.

Some example implementations provide a method of optimizing a flight of an aircraft with at least one segment of formation flight in which the aircraft is a trailing aircraft relative to a vortex generated by a leading aircraft, the method comprising: accessing flight plans for flights of a fleet of aircraft that includes the flight of the aircraft; transforming the flight plans into values of a set of features that describe segments of the flights; applying the values of the set of features to a machine learning model trained to predict the at least one segment of formation flight during which the aircraft is within a region that includes at least one second aircraft of the fleet of aircraft that is thereby capable of serving as the leading aircraft in the at least one segment of formation flight; sending a notification to the aircraft of the at least one segment of formation flight and the at least one second aircraft that is capable of serving as the leading aircraft; and sending a second notification to the at least one second aircraft of the at least one segment of formation flight and the aircraft that is capable of serving as the trailing aircraft.

In some example implementations of the method of any preceding example implementation, or any combination of any preceding example implementations, the method further comprises: accessing flight data for historical flights of the fleet of aircraft, the flight data including values of properties or characteristics of the historical flights; performing a feature construction to create the set of features from the properties or characteristics; and training the machine learning model using the set of features, and using at least some of the values of the properties or characteristics as a training dataset.

In some example implementations of the method of any preceding example implementation, or any combination of any preceding example implementations, the at least one segment of formation flight includes a particular segment during which the aircraft is within the region that includes multiple second aircraft that are capable of serving as the leading aircraft, and the method further comprises: determining values of an operational efficiency metric for the aircraft in the formation flight with respective ones of the multiple second aircraft; and selecting one of the multiple second aircraft based on a comparison of the values of the operational efficiency metric, and wherein the notification includes a notification of the particular segment and the one of the multiple second aircraft, and the second notification is sent to the one of the multiple aircraft.

In some example implementations of the method of any preceding example implementation, or any combination of any preceding example implementations, each flight subject to compliance with air traffic control requirements, the values of the operational efficiency metric are determined subject to the air traffic control requirements.

In some example implementations of the method of any preceding example implementation, or any combination of any preceding example implementations, the flight plans are accessed and transformed, and the values of the set of features are applied to the machine learning model, prior to the flight of the aircraft, and wherein the method further comprises generating an updated flight plan for the aircraft that indicates the at least one segment of formation flight and the at least one second aircraft, and sending the notification includes sending the updated flight plan to the aircraft.

In some example implementations of the method of any preceding example implementation, or any combination of any preceding example implementations, the flight plans are accessed and transformed, the values of the set of features are applied to the machine learning model, and the notification is sent to the aircraft, during the flight of the aircraft.

In some example implementations of the method of any preceding example implementation, or any combination of any preceding example implementations, the method comprising optimizing multiple ones of the flights of multiple aircraft of the fleet of aircraft, wherein the values of the set of features are applied to the machine learning model trained to predict a respective at least one segment of formation flight of each of the multiple aircraft during which the aircraft is within a region that includes a respective at least one second aircraft that is thereby capable of serving as the leading aircraft in the respective at least one segment of formation flight, wherein sending the notification includes sending a respective notification to each of the multiple aircraft of the respective at least one segment of formation flight and the respective at least one second aircraft that is capable of serving as the leading aircraft, and wherein sending the second notification includes sending a respective second notification to each of the respective at least one second aircraft of the respective at least one segment of formation flight and the aircraft that is capable of serving as the trailing aircraft.

Some example implementations provide an apparatus for optimizing a flight of an aircraft with at least one segment of formation flight in which the aircraft is a trailing aircraft relative to a vortex generated by a leading aircraft, the apparatus comprising a memory configured to store computer-readable program code; and processing circuitry configured to access the memory, and execute the computer-readable program code to cause the apparatus to at least perform the method of any preceding example implementation, or any combination of any preceding example implementations.

Some example implementations provide a computer-readable storage medium for optimizing a flight of an aircraft with at least one segment of formation flight in which the aircraft is a trailing aircraft relative to a vortex generated by a leading aircraft, the computer-readable storage medium being non-transitory and having computer-readable program code stored therein that, in response to execution by processing circuitry, causes an apparatus to at least perform the method of any preceding example implementation, or any combination of any preceding example implementations.

These and other features, aspects, and advantages of the present disclosure will be apparent from a reading of the following detailed description together with the accompanying figures, which are briefly described below. The present disclosure includes any combination of two, three, four or more features or elements set forth in this disclosure, regardless of whether such features or elements are expressly combined or otherwise recited in a specific example implementation described herein. This disclosure is intended to be read holistically such that any separable features or elements of the disclosure, in any of its aspects and example implementations, should be viewed as combinable unless the context of the disclosure clearly dictates otherwise.

It will therefore be appreciated that this Brief Summary is provided merely for purposes of summarizing some example implementations so as to provide a basic understanding of some aspects of the disclosure. Accordingly, it will be appreciated that the above described example implementations are merely examples and should not be construed to narrow the scope or spirit of the disclosure in any way. Other example implementations, aspects and advantages will become apparent from the following detailed description taken in conjunction with the accompanying figures which illustrate, by way of example, the principles of some described example implementations.

BRIEF DESCRIPTION OF THE FIGURE(S)

Having thus described example implementations of the disclosure in general terms, reference will now be made to the accompanying figures, which are not necessarily drawn to scale, and wherein:

DETAILED DESCRIPTION

Some implementations of the present disclosure will now be described more fully hereinafter with reference to the accompanying figures, in which some, but not all implementations of the disclosure are shown. Indeed, various implementations of the disclosure may be embodied in many different forms and should not be construed as limited to the implementations set forth herein; rather, these example implementations are provided so that this disclosure will be thorough and complete, and will fully convey the scope of the disclosure to those skilled in the art. Like reference numerals refer to like elements throughout.

Unless specified otherwise or clear from context, references to first, second or the like should not be construed to imply a particular order. A feature described as being above another feature (unless specified otherwise or clear from context) may instead be below, and vice versa; and similarly, features described as being to the left of another feature else may instead be to the right, and vice versa. Also, while reference may be made herein to quantitative measures, values, geometric relationships or the like, unless otherwise stated, any one or more if not all of these may be absolute or approximate to account for acceptable variations that may occur, such as those due to engineering tolerances or the like.

As used herein, unless specified otherwise or clear from context, the "or" of a set of operands is the "inclusive or" and thereby true if and only if one or more of the operands is true, as opposed to the "exclusive or" which is false when all of the operands are true. Thus, for example, "[A] or [B]" is true if [A] is true, or if [B] is true, or if both [A] and [B] are true. Further, the articles "a" and "an" mean "one or more," unless specified otherwise or clear from context to be directed to a singular form. Furthermore, it should be understood that unless otherwise specified, the terms "data," "content," "digital content," "information," and similar terms may be at times used interchangeably.

Figure 1:
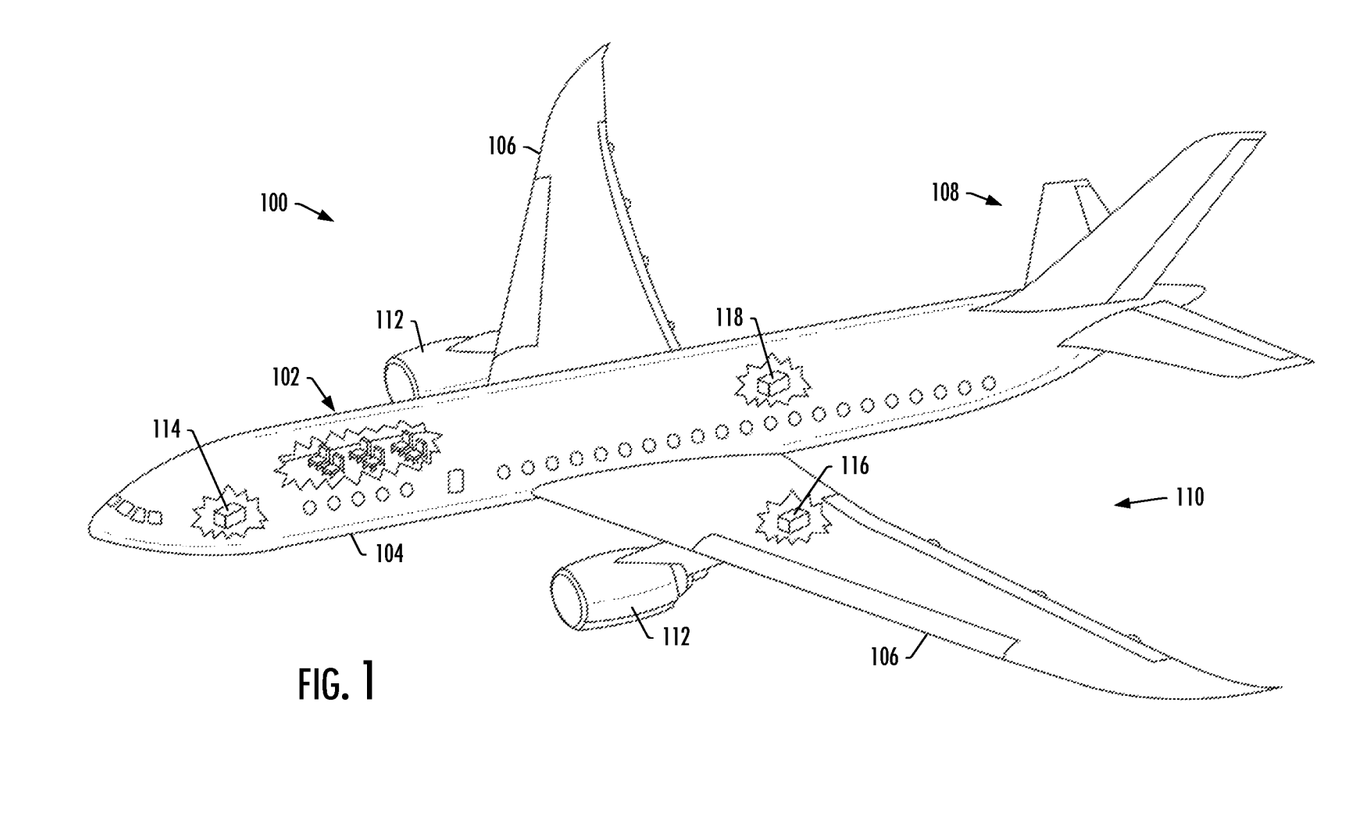
FIG. 1 illustrates an aircraft according to some example implementations of the present disclosure.

Example implementations of the present disclosure are directed to aircraft fleet operation. FIG. 1 illustrates one type of aircraft 100 that may benefit from example implementations of the present disclosure. As shown, the aircraft includes an airframe 102 with a fuselage 104, wings 106 and tail 108. The aircraft also includes a plurality of high-level systems 110 such as a propulsion system. In the particular example shown in FIG. 1, the propulsion system includes two wing-mounted engines 112. In other embodiments, the propulsion system can include other arrangements, for example, engines carried by other portions of the aircraft including the fuselage and/or the tail. The high-level systems may also include an electrical system 114, hydraulic system 116 and/or environmental system 118. Any number of other systems may be included.

Figure 2:
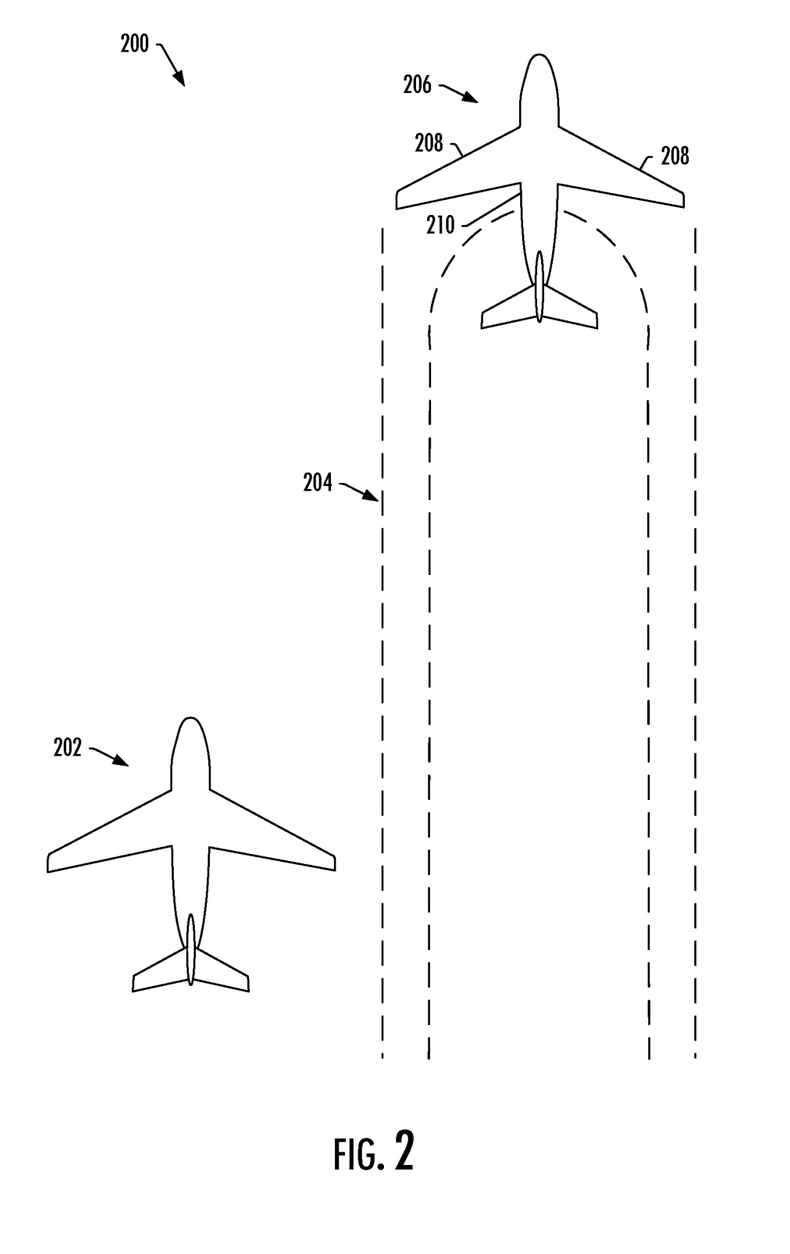
FIG. 2 illustrates formation flight in which an aircraft is a trailing aircraft relative to a vortex generated by a leading aircraft, according to some example implementations.

FIG. 2 illustrates formation flight 200 in which an aircraft such as aircraft 100 is a trailing aircraft 202 relative to a vortex 204 generated by a leading aircraft 206, according to some example implementations of the present disclosure. The vortex is at times referred to as a wingtip vortex or a wake, and the vortex is generally a circular pattern of rotating air trailing a wingtip as a wing 208 of the leading aircraft generate lift. The aircraft with multiple wings may therefore collectively generate vortices that trail the wingtips as the wings of the leading aircraft generate lift. Because the swirling motion of the vortex has a generally circular pattern, upwardly directed portions of the swirling air can provide updraft forces. Moreover, the vortex swirls from the wingtip such that the upwardly directed portion of the vortex emitted from the leading aircraft is located at the outward side of the vortex or at the side of the vortex farthest away from the fuselage 210 of the leading aircraft.

Because of the positioning of the upwardly directed portion of the vortex 204, the trailing aircraft 202 can approach the vortex from a trailing position outside of the vortex, and be positioned at least partially within the upwardly directed portion of the vortex. In such a position, the updraft forces generated by the upwardly directed portion impact the trailing aircraft to at least partially buoy or lift the trailing aircraft. In this manner, with the trailing aircraft in a desired position, the vortex provides an aerodynamic benefit to the trailing aircraft in the form of operational benefits, such as increased fuel economy and flight range.

Figure 3:
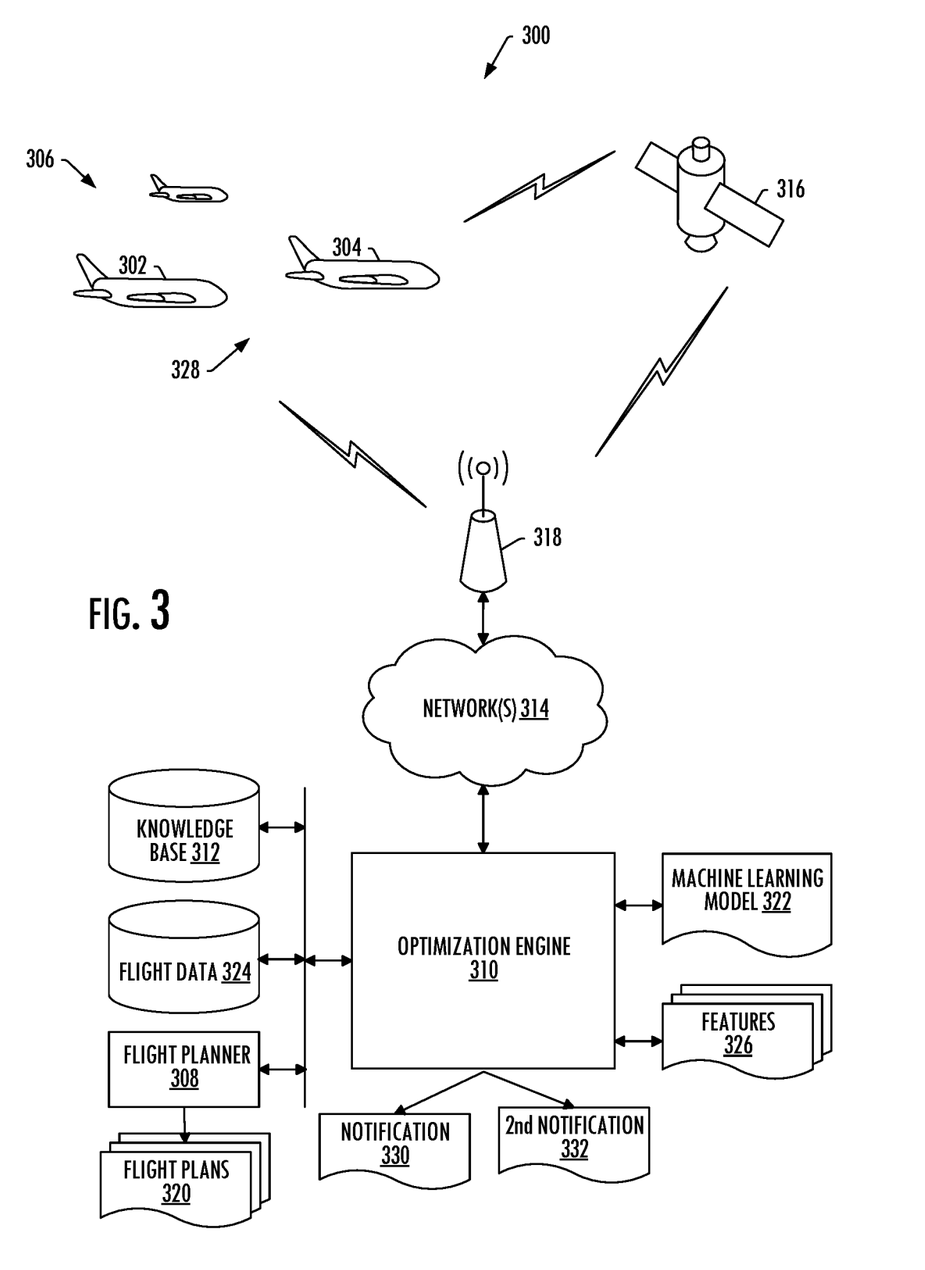
FIG. 3 illustrates a system for optimizing a flight of an aircraft, according to some example implementations.

FIG. 3 illustrates a system 300 for optimizing a flight of an aircraft 302 such as aircraft 100 with at least one segment of formation flight in which the aircraft is a trailing aircraft 202 relative to a vortex 204 generated by a leading aircraft 206, according to example implementations of the present disclosure. In some examples, the aircraft and second aircraft 306 capable of serving as the leading aircraft are in a fleet of aircraft 306; and in some of these examples, the fleet of aircraft are aircraft that have a common operator such as an airline, leasing company, military entity, service organization or the like.

The system 300 may include any of a number of different subsystems (each an individual system) for performing one or more functions or operations. As shown, in some examples, the system includes a flight planner 308, an optimization engine 310 and a knowledge base 312, which in some further examples may be located at an operations center for the fleet of aircraft. The subsystems including the flight planner, optimization engine and knowledge base may be co-located or directly coupled to one another, or in some examples, various ones of the subsystems may communicate with one another across one or more computer networks 314. Similarly, aircraft of the fleet of aircraft 306 may communicate with one or more of the subsystems across the one or more computer networks, which during flight may be facilitated by one or more artificial satellites 316, ground stations 318 and the like.

Although shown as part of the system 300, it should be understood that any one or more of the subsystems including the flight planner 308, optimization engine 310 and knowledge base 312 may function or operate as a separate system without regard to any of the other subsystems. It should also be understood that the system may include one or more additional or alternative subsystems than those shown in FIG. 3.

According to some example implementations of the present disclosure, the flight planner 308 is configured to generate flight plans 320 for flights of the fleet of aircraft 306 that includes a flight of the aircraft 302. The optimization engine 310 is configured to access the flight plans. The optimization engine is configured to use a machine learning model 322 to optimize the flight of the aircraft with at least one segment of formation flight in which the aircraft is the trailing aircraft 202 relative to the vortex 204 generated by a leading aircraft 206. During a flight, the aircraft may take a path, and this path may be described by a series of waypoints that define a route the aircraft will travel. The route may be divided into segments; and in some examples, the segments may be defined by waypoints or pairs of waypoints of the series of waypoints that define the route. And the optimization may identify one or more of these segments as segments of formation flight of the aircraft.

To train the machine learning model 322, in some examples, the optimization engine 310 is configured to access flight data 324 for historical flights of the fleet of aircraft 302, including values of properties or characteristics of the historical flights. In some of these examples, the optimization engine is configured to perform a feature construction to create a set of features 326 that describe segments of the historical flights, from the properties or characteristics. And the optimization engine is configured to train the machine learning model using the set of features, and using at least some of the values of the properties or characteristics as a training dataset.

In some examples, the flight data 324 includes weather data that describes weather conditions during the historical flights. Additionally or alternatively, the flight data may include data from one or more sensors such as those employing radar, lidar, infrared sensors, cameras and the like. Another example of suitable flight data includes automatic, dependent surveillance-broadcast (ADS-B) data. ADS-B is a surveillance technology for tracking aircraft that uses satellite-based navigation technology and a broadcast communications data-link (ADS-B unit). An aircraft that is an ADS-B capable aircraft may use a satellite-based navigation receiver to derive its precise position from satellites, and combine that position with state information such as velocity, altitude and flight number.

The optimization engine 310 is configured to transform the flight plans 320 into values of the set of features 326 that also describe segments of the flights. The optimization engine is configured to apply the values of the set of features to the machine learning model 322 trained to predict at least one segment of formation flight during which the aircraft 302 is within a region 328 that includes at least one second aircraft 304 of the fleet of aircraft 306 that is thereby capable of serving as the leading aircraft 206 in the segment(s) of formation flight. Examples of a suitable machine learning model include a recurrent neural network (RNN), convolutional neural network (CNN) with post-processing by RNN, ensemble of decision trees (e.g., Adaptive Boosting), or the like.

The optimization engine 310 is configured to send a notification 330 to the aircraft 302 of the segment(s) of formation flight and the second aircraft 304 that is capable of serving as the leading aircraft 206. The notification may be sent as a suggestion to a pilot of the aircraft to navigate into formation flight with the second aircraft during the segment(s). The optimization engine is also configured to send a second notification 332 to the second aircraft of the segment(s) of formation flight and the aircraft that is capable of serving as the trailing aircraft 202.

In some examples, the segment(s) of formation flight includes a particular segment during which the aircraft 302 is within the region 328 that includes multiple second aircraft 304 that are capable of serving as the leading aircraft 206. In some of these examples, the optimization engine 310 is configured to determine values of an operational efficiency metric for the aircraft in the formation flight with respective ones of the multiple second aircraft. The operational efficiency metric is a standard of measurement of operational efficiency of the aircraft. Examples of a suitable operational efficiency metric include one or more of fuel savings, carbon emission savings, improved flight time, cost index (CI) savings or the like.

In some further examples, each flight subject to compliance with air traffic control requirements, and the optimization engine 310 is configured to determine the values of the operational efficiency metric subject to the air traffic control requirements. These air traffic control requirements may be accessed from the knowledge base 312 that includes the air traffic control requirements. The air traffic control requirements may include operational requirements of the fleet of aircraft, as well as regulatory requirements of air traffic control (ATC) that directs aircraft through the air transportation network. More particular examples of air traffic control requirements include traffic separation rules that maintain aircraft outside a minimum distance from other aircraft, terrain, obstacles and the like to reduce the risk of collision or other issues.

Also in some of examples in which the aircraft 302 is within the region 328 that includes multiple second aircraft 304 that are capable of serving as the leading aircraft 206, the optimization engine 310 is configured to select one of the multiple second aircraft based on a comparison of the values of the operational efficiency metric. The one of the multiple second aircraft may have a larger or largest value of the operational efficiency metric, which may be further limited to those of the multiple second aircraft for which the aircraft may remain compliant with the air traffic control requirements. The notification 330, then, includes a notification of the particular segment and the one of the multiple second aircraft, and the optimization engine is configured to send the second notification 332 to the one of the multiple aircraft.

In some examples, the optimization engine 310 is configured to access and transform the flight plans 320, and apply the values of the set of features 326 to the machine learning model 322, prior to the flight of the aircraft 302. In some of these examples, the optimization engine is further configured to generate an updated flight plan for the aircraft that indicates the segment(s) of formation flight and the second aircraft 304. Or the optimization engine may communicate with the flight planner 308 that is configured to generate the updated flight plan. The optimization engine configured to send the notification 330, then, includes the optimization engine configured to send the updated flight plan to the aircraft.

In some examples, the optimization engine 310 is configured to access and transform the flight plans 320, apply the values of the set of features 326 to the machine learning model 322, and send the notification 330 to the aircraft 302, during the flight of the aircraft.

The optimization of the flight of the aircraft 302 may be repeated during the flight and others of the flights of the fleet of aircraft 306, as respective positions and respective trajectories of the aircraft are tracked by the optimization engine 310, such as using one or more of the sensors described above including ADS-B. Each time the optimization is repeated, the flight plans may be updated to reflect the respective positions and reflective trajectories. The flight plans as updated may be transformed into new values of the set of features 326, which may again be applied to the machine learning model 322. The machine learning model may predict the same or another segment of formation flight of the aircraft with the same or another second aircraft 304, and a new notification and a new second notification may be sent to the aircraft and second aircraft.

In some examples, the optimization engine 310 is configured to optimize multiple ones of the flights of multiple aircraft of the fleet of aircraft 306. In some of these examples, the optimization engine is configured to apply the values of the set of features 326 to the machine learning model 322. The machine learning model is trained to predict a respective at least one segment of formation flight of each of the multiple aircraft during which the aircraft is within a region that includes a respective at least one second aircraft that is thereby capable of serving as the leading aircraft in the respective at least one segment of formation flight.

The optimization engine 310 configured to send the notification 330 includes the optimization engine configured to send a respective notification to each of the multiple aircraft. The respective notification is of the respective at least one segment of formation flight and the respective at least one second aircraft 304 that is capable of serving as the leading aircraft 206. And the optimization engine configured to send the second notification 332 includes the optimization engine configured to send a respective second notification to each of the respective at least one second aircraft. The respective second notification is of the respective at least one segment of formation flight and the aircraft that is capable of serving as the trailing aircraft 202.

Figure 4A:
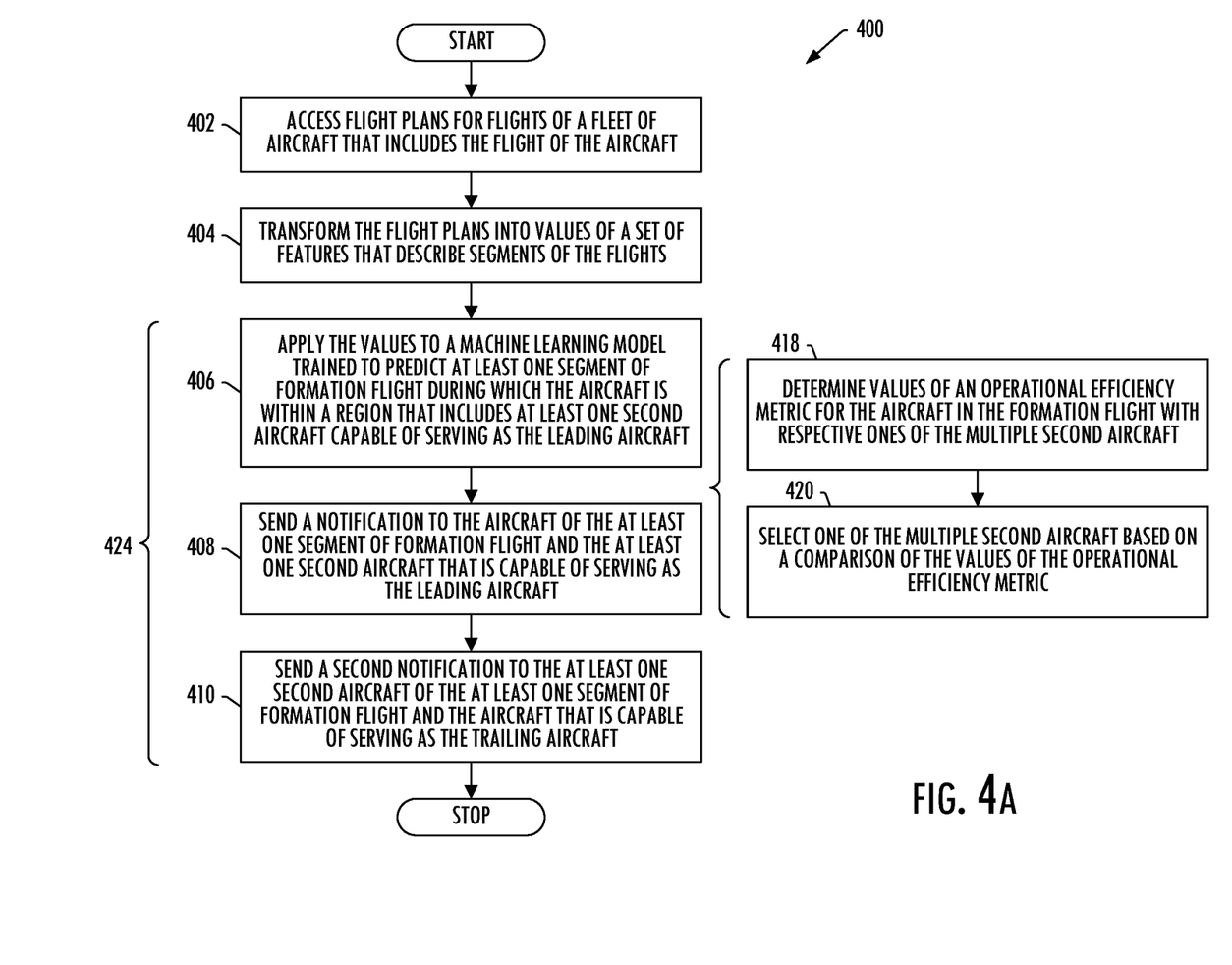
FIGS. 4A, 4B and 4C are flowcharts illustrating various steps in a method of optimizing a flight of an aircraft, according to some example implementations.
Figure 4B:
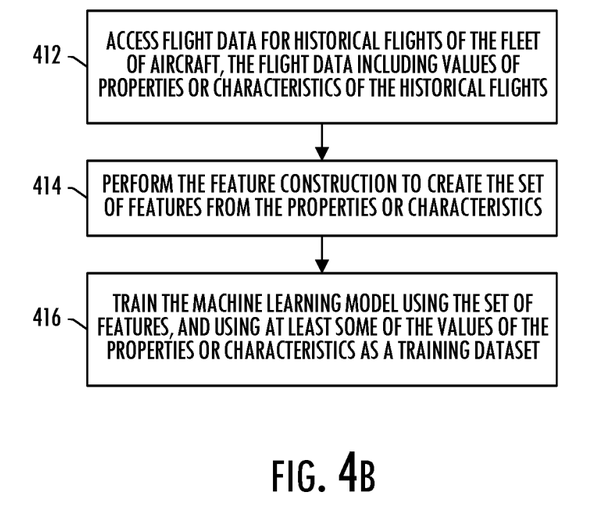
Figure 4C:
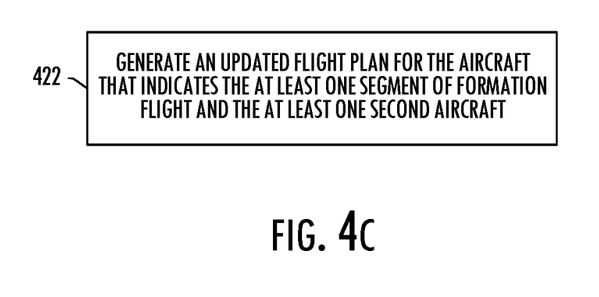

FIGS. 4A, 4B and 4C are flowcharts illustrating various steps in a method 400 of optimizing a flight of an aircraft with at least one segment of formation flight in which the aircraft is a trailing aircraft relative to a vortex generated by a leading aircraft. As shown at blocks 402 and 404 of FIG. 4A, the method includes accessing flight plans for flights of a fleet of aircraft that includes the flight of the aircraft, and transforming the flight plans into values of a set of features that describe segments of the flights. The method includes applying the values of the set of features to a machine learning model trained to predict the at least one segment of formation flight during which the aircraft is within a region that includes at least one second aircraft of the fleet of aircraft that is thereby capable of serving as the leading aircraft in the at least one segment of formation flight, as shown at block 406. A notification is sent to the aircraft of the at least one segment of formation flight and the at least one second aircraft that is capable of serving as the leading aircraft, and a second notification is sent to the at least one second aircraft of the at least one segment of formation flight and the aircraft that is capable of serving as the trailing aircraft, as shown at blocks 408 and 410.

In some examples, the method 400 further includes accessing flight data for historical flights of the fleet of aircraft, the flight data including values of properties or characteristics of the historical flights, as shown at block 412 of FIG. 4B. In some of these examples, the method also includes performing a feature construction to create the set of features from the properties or characteristics, and training the machine learning model using the set of features, and using at least some of the values of the properties or characteristics as a training dataset, as shown at blocks 414 and 416.

Returning to FIG. 4A, in some examples, the at least one segment of formation flight includes a particular segment during which the aircraft is within the region that includes multiple second aircraft that are capable of serving as the leading aircraft. In some of these examples, the method 400 further includes determining values of an operational efficiency metric for the aircraft in the formation flight with respective ones of the multiple second aircraft, and selecting one of the multiple second aircraft based on a comparison of the values of the operational efficiency metric, as shown at blocks 418 and 420. In some further examples, each flight subject to compliance with air traffic control requirements, and the values of the operational efficiency metric are determined subject to the air traffic control requirements. In some examples, the notification includes a notification of the particular segment and the one of the multiple second aircraft, and the second notification is sent at block 410 to the one of the multiple aircraft.

In some examples, the flight plans are accessed at block 402 and transformed at block 404, and the values of the set of features are applied to the machine learning model at block 406, prior to the flight of the aircraft. In some of these examples, the method 400 further includes generating an updated flight plan for the aircraft that indicates the at least one segment of formation flight and the at least one second aircraft, as shown at block 422 of FIG. 4C. And in some of these examples, sending the notification at block 408 includes sending the updated flight plan to the aircraft.

In some examples, the flight plans are accessed at block 402 and transformed at block 404, the values of the set of features are applied to the machine learning model at block 406, and the notification is sent to the aircraft at block 408, during the flight of the aircraft.

In some examples, the method 400 includes optimizing multiple ones of the flights of multiple aircraft of the fleet of aircraft, as shown at 424 of FIG. 4A. In some of these examples, the values of the set of features are applied at block 406 to the machine learning model trained to predict a respective at least one segment of formation flight of each of the multiple aircraft during which the aircraft is within a region that includes a respective at least one second aircraft that is thereby capable of serving as the leading aircraft in the respective at least one segment of formation flight. Sending the notification at block 408 includes sending a respective notification to each of the multiple aircraft of the respective at least one segment of formation flight and the respective at least one second aircraft that is capable of serving as the leading aircraft. And sending the second notification at block 410 includes sending a respective second notification to each of the respective at least one second aircraft of the respective at least one segment of formation flight and the aircraft that is capable of serving as the trailing aircraft.

According to example implementations of the present disclosure, the system 300 and its subsystems including the flight planner 308, the optimization engine 310 and the knowledge base 312 may be implemented by various means. Means for implementing the system and its subsystems may include hardware, alone or under direction of one or more computer programs from a computer-readable storage medium. In some examples, one or more apparatuses may be configured to function as or otherwise implement the system and its subsystems shown and described herein. In examples involving more than one apparatus, the respective apparatuses may be connected to or otherwise in communication with one another in a number of different manners, such as directly or indirectly via a wired or wireless network or the like.

Figure 5:
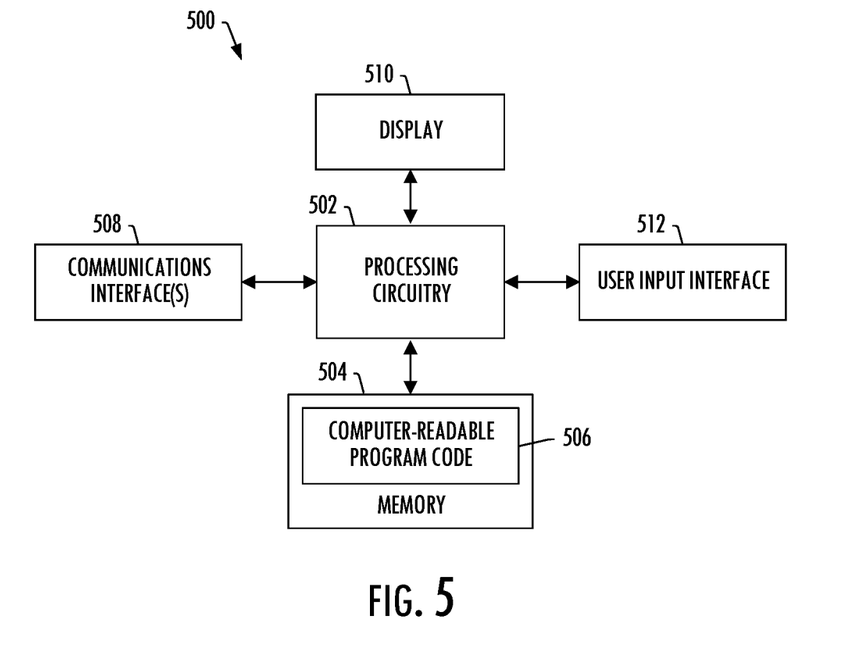
FIG. 5 illustrates an apparatus according to some example implementations.

FIG. 5 illustrates an apparatus 500 according to some example implementations of the present disclosure. Generally, an apparatus of exemplary implementations of the present disclosure may comprise, include or be embodied in one or more fixed or portable electronic devices. Examples of suitable electronic devices include a smartphone, tablet computer, laptop computer, desktop computer, workstation computer, server computer or the like. The apparatus may include one or more of each of a number of components such as, for example, processing circuitry 502 (e.g., processor unit) connected to a memory 504 (e.g., storage device).

The processing circuitry 502 may be composed of one or more processors alone or in combination with one or more memories. The processing circuitry is generally any piece of computer hardware that is capable of processing information such as, for example, data, computer programs and/or other suitable electronic information. The processing circuitry is composed of a collection of electronic circuits some of which may be packaged as an integrated circuit or multiple interconnected integrated circuits (an integrated circuit at times more commonly referred to as a "chip"). The processing circuitry may be configured to execute computer programs, which may be stored onboard the processing circuitry or otherwise stored in the memory 504 (of the same or another apparatus).

The processing circuitry 502 may be a number of processors, a multi-core processor or some other type of processor, depending on the particular implementation. Further, the processing circuitry may be implemented using a number of heterogeneous processor systems in which a main processor is present with one or more secondary processors on a single chip. As another illustrative example, the processing circuitry may be a symmetric multi-processor system containing multiple processors of the same type. In yet another example, the processing circuitry may be embodied as or otherwise include one or more ASICs, FPGAs or the like. Thus, although the processing circuitry may be capable of executing a computer program to perform one or more functions, the processing circuitry of various examples may be capable of performing one or more functions without the aid of a computer program. In either instance, the processing circuitry may be appropriately programmed to perform functions or operations according to example implementations of the present disclosure.

The memory 504 is generally any piece of computer hardware that is capable of storing information such as, for example, data, computer programs (e.g., computer-readable program code 506) and/or other suitable information either on a temporary basis and/or a permanent basis. The memory may include volatile and/or non-volatile memory, and may be fixed or removable. Examples of suitable memory include random access memory (RAM), read-only memory (ROM), a hard drive, a flash memory, a thumb drive, a removable computer diskette, an optical disk, a magnetic tape or some combination of the above. Optical disks may include compact disk-read only memory (CD-ROM), compact disk-read/write (CD-R/W), DVD or the like. In various instances, the memory may be referred to as a computer-readable storage medium. The computer-readable storage medium is a non-transitory device capable of storing information, and is distinguishable from computer-readable transmission media such as electronic transitory signals capable of carrying information from one location to another. Computer-readable medium as described herein may generally refer to a computer-readable storage medium or computer-readable transmission medium.

In addition to the memory 504, the processing circuitry 502 may also be connected to one or more interfaces for displaying, transmitting and/or receiving information. The interfaces may include a communications interface 508 (e.g., communications unit) and/or one or more user interfaces. The communications interface may be configured to transmit and/or receive information, such as to and/or from other apparatus(es), network(s) or the like. The communications interface may be configured to transmit and/or receive information by physical (wired) and/or wireless communications links. Examples of suitable communication interfaces include a network interface controller (NIC), wireless NIC (WNIC) or the like.

The user interfaces may include a display 510 and/or one or more user input interfaces 512 (e.g., input/output unit). The display may be configured to present or otherwise display information to a user, suitable examples of which include a liquid crystal display (LCD), light-emitting diode display (LED), plasma display panel (PDP) or the like. The user input interfaces may be wired or wireless, and may be configured to receive information from a user into the apparatus, such as for processing, storage and/or display. Suitable examples of user input interfaces include a microphone, image or video capture device, keyboard or keypad, joystick, touch-sensitive surface (separate from or integrated into a touchscreen), biometric sensor or the like. The user interfaces may further include one or more interfaces for communicating with peripherals such as printers, scanners or the like.

As indicated above, program code instructions may be stored in memory, and executed by processing circuitry that is thereby programmed, to implement functions of the systems, subsystems, tools and their respective elements described herein. As will be appreciated, any suitable program code instructions may be loaded onto a computer or other programmable apparatus from a computer-readable storage medium to produce a particular machine, such that the particular machine becomes a means for implementing the functions specified herein. These program code instructions may also be stored in a computer-readable storage medium that can direct a computer, a processing circuitry or other programmable apparatus to function in a particular manner to thereby generate a particular machine or particular article of manufacture. The instructions stored in the computer-readable storage medium may produce an article of manufacture, where the article of manufacture becomes a means for implementing functions described herein. The program code instructions may be retrieved from a computer-readable storage medium and loaded into a computer, processing circuitry or other programmable apparatus to configure the computer, processing circuitry or other programmable apparatus to execute operations to be performed on or by the computer, processing circuitry or other programmable apparatus.

Retrieval, loading and execution of the program code instructions may be performed sequentially such that one instruction is retrieved, loaded and executed at a time. In some example implementations, retrieval, loading and/or execution may be performed in parallel such that multiple instructions are retrieved, loaded, and/or executed together. Execution of the program code instructions may produce a computer-implemented process such that the instructions executed by the computer, processing circuitry or other programmable apparatus provide operations for implementing functions described herein.

Execution of instructions by a processing circuitry, or storage of instructions in a computer-readable storage medium, supports combinations of operations for performing the specified functions. In this manner, an apparatus 500 may include a processing circuitry 502 and a computer-readable storage medium or memory 504 coupled to the processing circuitry, where the processing circuitry is configured to execute computer-readable program code 506 stored in the memory. It will also be understood that one or more functions, and combinations of functions, may be implemented by special purpose hardware-based computer systems and/or processing circuitry which perform the specified functions, or combinations of special purpose hardware and program code instructions.

Many modifications and other implementations of the disclosure set forth herein will come to mind to one skilled in the art to which the disclosure pertains having the benefit of the teachings presented in the foregoing description and the associated figures. Therefore, it is to be understood that the disclosure is not to be limited to the specific implementations disclosed and that modifications and other implementations are intended to be included within the scope of the appended claims. Moreover, although the foregoing description and the associated figures describe example implementations in the context of certain example combinations of elements and/or functions, it should be appreciated that different combinations of elements and/or functions may be provided by alternative implementations without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

What is claimed is:

1. An apparatus for optimizing a flight of a first aircraft with at least one segment of formation flight in which the first aircraft is a trailing aircraft relative to a vortex generated by a leading aircraft, the apparatus comprising:

a memory configured to store computer-readable program code; and processing circuitry configured to access the memory, and execute the computer-readable program code to cause the apparatus to at least:

access flight plans for flights of a fleet of aircraft that includes the flight of the first aircraft, the flight plans including real-time sensor data collected during the flight of the first aircraft;

transform the flight plans into values of a set of features that describe segments of the flights;

apply the values of the set of features to a machine learning model trained to output a first formation flight notification, indicating at least one segment of formation flight in which an operational efficiency metric of the flight of the first aircraft would be improved by flying in formation with a second aircraft serving as the leading aircraft, wherein the operational efficiency metric is a standard of measurement of operational efficiency of an aircraft determined by an optimization engine, the optimization engine configured to determine values of the operational efficiency metric subject to air traffic control requirements that comprise operational requirements of the fleet of aircraft that include air traffic separation rules that maintain each aircraft outside a minimum distance from other aircraft;

generate an updated flight plan for the first aircraft indicating the at least one segment of formation flight and the second aircraft that is capable of serving as the leading aircraft;

send the first formation flight notification and the updated flight plan to the first aircraft; and send a second formation flight notification to the second aircraft indicating the at least one segment of formation flight and indicating that the first aircraft is capable of serving as the trailing aircraft.

2. The apparatus of claim 1, wherein the processing circuitry is configured to execute the computer-readable program code to cause the apparatus to further at least:

access flight data for historical flights of the fleet of aircraft, the flight data including values of properties or characteristics of the historical flights;

perform a feature construction to create the set of features from the properties or characteristics; and train the machine learning model using the set of features, and using at least some of the values of the properties or characteristics as a training dataset.

3. The apparatus of claim 1, wherein the at least one segment of formation flight includes a particular segment during which the first aircraft is within a region that includes multiple formation candidate aircraft that are capable of serving as the leading aircraft, and the processing circuitry is configured to execute the computer-readable program code to cause the apparatus to further at least:

determine the values of the operational efficiency metric for the first aircraft in the formation flight with respective ones of the multiple formation candidate aircraft; and select one of the multiple formation candidate aircraft as the second aircraft based on a comparison of the values of the operational efficiency metric.

4. The apparatus of claim 1, wherein the processing circuitry is configured to execute the computer-readable program code to further cause the apparatus to access and transform the flight plans, and apply the values of the set of features to the machine learning model, prior to the flight of the first aircraft, and wherein the apparatus caused to send the first formation flight notification includes the apparatus caused to send the updated flight plan to the first aircraft.

5. The apparatus of claim 1, wherein the processing circuitry is configured to execute the computer-readable program code to further cause the apparatus to access and transform the flight plans, apply the values of the set of features to the machine learning model, and send the first formation flight notification to the first aircraft, during the flight of the first aircraft.

6. The apparatus of claim 1, wherein the processing circuitry is configured to execute the computer-readable program code to further cause the apparatus to:

optimize multiple ones of flights of multiple aircraft of the fleet of aircraft, wherein the apparatus is caused to apply the values of the set of features to the machine learning model trained to predict a respective at least one segment of formation flight of each of the multiple aircraft during which the first aircraft is within a region that includes a respective at least one second aircraft that is thereby capable of serving as the leading aircraft in the respective at least one segment of formation flight, wherein the apparatus caused to send the first formation flight notification includes the apparatus caused to send a respective notification to each of the multiple aircraft of the respective at least one segment of formation flight and the respective at least one second aircraft that is capable of serving as the leading aircraft.

7. A method of optimizing a flight of a first aircraft with at least one segment of formation flight in which the first aircraft is a trailing aircraft relative to a vortex generated by a leading aircraft, the method comprising:

accessing flight plans for flights of a fleet of aircraft that includes the flight of the first aircraft, the flight plans including real-time sensor data collected during the flight of the first aircraft;

transforming the flight plans into values of a set of features that describe segments of the flights;

applying the values of the set of features to a machine learning model trained to output a first formation flight notification, indicating at least one segment of formation flight in which an operational efficiency metric of the flight of the first aircraft would be improved by flying in formation with a second aircraft serving as the leading aircraft, wherein the operational efficiency metric is a standard of measurement of operational efficiency of an aircraft determined by an optimization engine, the optimization engine configured to determine values of the operational efficiency metric subject to air traffic control requirements that comprise operational requirements of the fleet of aircraft that include air traffic separation rules that maintain each aircraft outside a minimum distance from other aircraft;

generating an updated flight plan for the first aircraft indicating the at least one segment of formation flight and the second aircraft that is capable of serving as the leading aircraft;

sending the first formation flight notification and the updated flight plan to the first aircraft; and sending a second formation flight notification to the second aircraft indicating the at least one segment of formation flight and indicating that the first aircraft is capable of serving as the trailing aircraft.

8. The method of claim 7, further comprising:

accessing flight data for historical flights of the fleet of aircraft, the flight data including values of properties or characteristics of the historical flights;

performing a feature construction to create the set of features from the properties or characteristics; and training the machine learning model using the set of features, and using at least some of the values of the properties or characteristics as a training dataset.

9. The method of claim 7, wherein the at least one segment of formation flight includes a particular segment during which the first aircraft is within a region that includes multiple formation candidate aircraft that are capable of serving as the leading aircraft, and the method further comprises:

determining the values of the operational efficiency metric for the first aircraft in the formation flight with respective ones of the multiple formation candidate aircraft; and selecting one of the multiple formation candidate aircraft as the second aircraft based on a comparison of the values of the operational efficiency metric.

10. The method of claim 7, wherein the flight plans are accessed and transformed, and the values of the set of features are applied to the machine learning model, prior to the flight of the first aircraft.

11. The method of claim 7, wherein the flight plans are accessed and transformed, the values of the set of features are applied to the machine learning model, and the first formation flight notification is sent to the first aircraft, during the flight of the first aircraft.

12. The method of claim 7, further comprising:
optimizing multiple ones of flights of multiple aircraft of the fleet of aircraft,
wherein the values of the set of features are applied to the machine learning model trained to predict a respective at least one segment of formation flight of each of the multiple aircraft during which the first aircraft is within a region that includes a respective at least one second aircraft that is thereby capable of serving as the leading aircraft in the respective at least one segment of formation flight,
wherein sending the first formation flight notification includes sending a respective notification to each of the multiple aircraft of the respective at least one segment of formation flight and the respective at least one second aircraft that is capable of serving as the leading aircraft.

13. A computer-readable storage medium for optimizing a flight of a first aircraft with at least one segment of formation flight in which the first aircraft is a trailing aircraft relative to a vortex generated by a leading aircraft, the computer-readable storage medium being non-transitory and having computer-readable program code stored therein that, in response to execution by processing circuitry, causes an apparatus to at least:
access flight plans for flights of a fleet of aircraft that includes the flight of the first aircraft, the flight plans including real-time sensor data collected during the flight of the first aircraft;
transform the flight plans into values of a set of features that describe segments of the flights;
apply the values of the set of features to a machine learning model trained to output a first formation flight notification, indicating at least one segment of formation flight in which an operational efficiency metric of the flight of the first aircraft would be improved by flying in formation with a second aircraft serving as the leading aircraft, wherein the operational efficiency metric is a standard of measurement of operational efficiency of an aircraft determined by an optimization engine, the optimization engine configured to determine values of the operational efficiency metric subject to air traffic control requirements that comprise operational requirements of the fleet of aircraft that include air traffic separation rules that maintain each aircraft outside a minimum distance from other aircraft;
generate an updated flight plan for the first aircraft indicating the at least one segment of formation flight and the second aircraft that is capable of serving as the leading aircraft;
send the first formation flight notification and the updated flight plan to the first aircraft; and
send a second formation flight notification to the second aircraft indicating the at least one segment of formation flight and indicating that the first aircraft is capable of serving as the trailing aircraft.

14. The computer-readable storage medium of claim 13, wherein the computer-readable storage medium has further computer-readable program code stored therein that, in response to execution by the processing circuitry, causes the apparatus to further at least:
access flight data for historical flights of the fleet of aircraft, the flight data including values of properties or characteristics of the historical flights;
perform a feature construction to create the set of features from the properties or characteristics; and
train the machine learning model using the set of features, and using at least some of the values of the properties or characteristics as a training dataset.

15. The computer-readable storage medium of claim 13, wherein the at least one segment of formation flight includes a particular segment during which the first aircraft is within a region that includes multiple formation candidate aircraft that are capable of serving as the leading aircraft, and the computer-readable storage medium has further computer-readable program code stored therein that, in response to execution by the processing circuitry, causes the apparatus to further at least:
determine the values of the operational efficiency metric for the first aircraft in the formation flight with respective ones of the multiple formation candidate aircraft; and
select one of the multiple formation candidate aircraft as the second aircraft based on a comparison of the values of the operational efficiency metric.

16. The computer-readable storage medium of claim 13, wherein the apparatus is caused to access and transform the flight plans, and apply the values of the set of features to the machine learning model, prior to the flight of the first aircraft.

17. The computer-readable storage medium of claim 13, wherein the apparatus is caused to access and transform the flight plans, apply the values of the set of features to the machine learning model, and send the first formation flight notification to the first aircraft, during the flight of the first aircraft.

18. The computer-readable storage medium of claim 13, wherein the apparatus is caused to:
apply the values of the set of features to the machine learning model trained to predict a respective at least one segment of formation flight of each of multiple aircraft of the fleet of aircraft during which the first aircraft is within a region that includes a respective at least one second aircraft that is thereby capable of serving as the leading aircraft in the respective at least one segment of formation flight,
wherein the apparatus caused to send the first formation flight notification includes the apparatus caused to send a respective notification to each of the multiple aircraft of the respective at least one segment of formation flight and the respective at least one second aircraft that is capable of serving as the leading aircraft.

19. The apparatus of claim 1, wherein the air traffic control requirements comprise operational requirements further of the fleet of aircraft that include regulatory requirements of air traffic control.

20. The apparatus of claim 1, wherein the air traffic control requirements comprise operational requirements further of the fleet of aircraft that include air traffic separation rules that maintain each aircraft outside a minimum distance from obstacles in surrounding terrain.

21. The method of claim 7, wherein the air traffic control requirements comprise operational requirements further of the fleet of aircraft that include separation rules that maintain each aircraft outside a minimum distance from obstacles in surrounding terrain.

* * * * *